April 11, 1944. L. B. THWAITES 2,346,404
POWER-OPERATED LOADING GEAR FOR VEHICLES
Filed Feb. 26, 1943
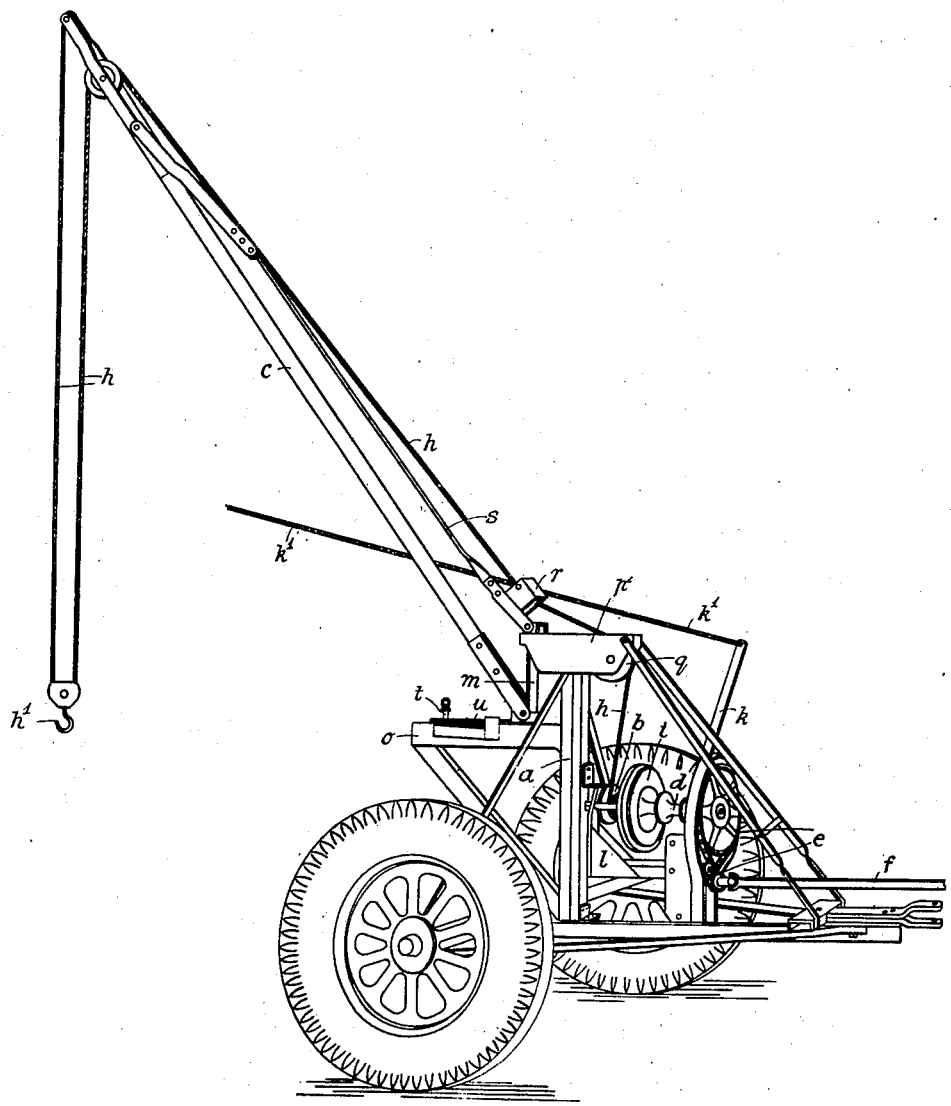

Patented Apr. 11, 1944

2,346,404

UNITED STATES PATENT OFFICE 2,346,404

POWER-OPERATED LOADING GEAR FOR VEHICLES

Leslie Basil Thwaites, Cubbington, near Leamington Spa, England

Application February 26, 1943, Serial No. 477,270 In Great Britain October 19, 1942

1 Claim. (Cl. 212—65)

This invention relates to lifting and lowering apparatus for loading and unloading vehicles and for moving heavy or bulky material from one place or position to another and has for its primary object to eliminate much of the manual labor which it is at present necessary to employ for these purposes.

Another object of the invention is to provide a more or less self-contained mobile lifting and lowering unit.

A further object of the invention is to take full advantage of the power available on a motor vehicle or tractor both for operating the lifting and lowering apparatus and for transporting it from one place to another.

With these and other objects in view the invention consists in the combination with a motor vehicle or tractor, or with a trailer adapted for connection therewith, of lifting and lowering apparatus adapted for operative connection with a source of power either on the vehicle, tractor or trailer or elsewhere.

In one convenient form the lifting and lowering apparatus may consist of a mobile unit comprising a support or frame mounted on wheels and adapted for trailing connection with a motor vehicle or tractor having a power take-off, and a crane mounted on said support or frame and adapted for operative connection with the said power take-off. Alternatively, the crane may be mounted on the motor vehicle or tractor itself or on a trailer connected therewith and operated either in a similar manner or by means of an engine or motor on the trailer or from some extraneous source of power.

In the construction shown in the accompanying illustration, the lifting and lowering apparatus is carried by a wheeled frame or support $a$ adapted for trailing connection with a motor vehicle or tractor, so that it can be readily moved to wherever the services of a power-operated lifting and lowering apparatus is required.

The lifting and lowering apparatus is of the kind comprising a winch $b$ and a slewing jib $c$. The shaft $d$ of the winch is driven by reduction gear $e$ from a universally jointed driving shaft $f$ adapted for operative connection with a power take-off on the vehicle or tractor to which the wheeled frame or support is attached. The drum of the winch, to which one end of the lifting cable $h$ is attached, is operatively connected with the aforesaid shaft $d$ by means of a clutch $i$ which is controlled by means of a lever $k$ arranged for remote operation by means of a cord $k^1$, the arrangement being such that loading from an appreciable area around the lifting and lowering unit can be carried out by a single person having the cord $k^1$ in one hand and the hook $h^1$ of the lifting cable in the other. By engaging the hook with the load and pulling on the cord to engage the clutch the load can be immediately raised onto the vehicle or moved to another position within the length of the lifting cable, the pull on the cord being then relaxed to release the clutch and the operation repeated for the next load. In this way material of a wide variety of kinds can be very quickly loaded and unloaded or moved from one place to another with the expenditure of the minimum amount of manual labor and with a very considerable saving in time.

The said winch together with the reduction gear $e$ and shaft $d$, is carried by a bracket $l$ attached to and projecting from the frame or support $a$.

The jib $c$ to which the other end of the lifting cable $h$ is attached is free to be slewed round in a horizontal plane about the axis of the post $m$ which is supported by brackets $o$ and $p$ attached to and projecting from said frame or support. The lifting cable is guided by a pulley $q$ on the frame $a$ and by a further pulley or roller mounted in a bracket $r$ moving with the tie rods of the jib.

Instead of deriving its motive power from the vehicle or tractor to which it is attached, the mobile lifting and lowering unit above described may, if desired, be made entirely self-contained by the provision thereof of a suitable type of motor, such as an internal combustion engine, or an electric motor.

The invention also includes the adaptation of lifting and lowering apparatus for mounting upon a motor vehicle or on a goods-carrying trailer. In such cases the winch together with the jib can be carried by a bracket one part of which is adapted to rest upon or be secured to a suitable part of the vehicle or the trailer whilst another part may form or carry the jib and the bearings for the winch and driving shafts.

In every case the jib during the loading or unloading operation is free to swing about a vertical axis but is preferably locked during transport, as by means of a pin $t$ passed through a plate $u$ carried by the jib into a hole in the bracket $o$.

Where the invention is applied to a trailer coupled to a motor vehicle or tractor the bracket carrying the winch and associated parts is mounted so as to be free to move about a vertical axis, and a bar secured to the tractor, as by means of the usual linch pin, has a fore and aft sliding engagement with guides carried by the said bracket. The arrangement is such that when the motor vehicle or the tractor is turning out of a straight course the bracket together with the winch is always maintained in true alignment with the said vehicle or tractor. In this case the driving shaft for the winch is connected with the power take off on the motor vehicle or tractor by means of a universally jointed connecting rod.

I claim:

A mobile unit for lifting and lowering purposes comprising a wheeled support adapted for trailing connection with a motor vehicle having a power take-off, a crane carried by said support and including a winch and a slewing jib, said winch comprising a shaft, a winding drum loosely mounted on said shaft, a clutch for connecting said drum to said shaft, means for connecting said shaft with the power take-off of said vehicle, ambulatory flexible remote control means for said clutch, a block, load engaging means connected with said block, and a flexible cable threaded through said block and having one end anchored and the other end attached to said winding drum, said remote control means being of such length that a single operator at any point of a large area about said mobile unit may simultaneously hold said block and said remote control means, whereby said operator, without moving from a given spot in said area, may connect a load to said block and thereafter manipulate said remote control means to engage said clutch to wind the cable on the drum and thereby lift the load and may thereafter or simultaneously during the lifting walk to another spot while holding said remote control means and causing the load to move with him and at such spot release said control means to permit the load to descend.

LESLIE BASIL THWAITES.